United States Patent Office 3,446,757
Patented May 27, 1969

3,446,757
HIGH MOLECULAR WEIGHT HYDROXYL-
CONTAINING POLYETHERS
Edwin J. Vandenberg, Wilmington, Del., assignor to
Hercules Incorporated, Wilmington, Del., a corporation of Delaware
No Drawing. Filed Sept. 26, 1966, Ser. No. 581,776
Int. Cl. C08g 23/04, 23/10, 23/06
U.S. Cl. 260—2                                    10 Claims

ABSTRACT OF THE DISCLOSURE

High molecular weight, benzene insoluble polyethers containing hydroxyl groups distributed throughout the polymer molecule and particularly the homopolymers of glycidol and the copolymers thereof with other epoxides and the process of preparing said polymers are described.

---

This invention relates to high molecular weight hydroxyl-containing polyethers and, more particularly, to polyethers having hydroxyl groups distributed throughout the polymer molecule.

It has previously been discovered that high molecular weight polyethers can be cleaved to produce polyethers having terminal hydroxyl groups at each end of the polymer chain. These hydroxyl-ended polyethers, which may also be defined as diols, have at best no more than 2 active hydrogen groups per molecule. In high molecular weight polymers, this amount of active hydrogen concentration, and hence functionality, is low.

Now, in accordance with this invention, it has been found that high molecular weight polyethers containing hydroxyl groups distributed throughout the polymer molecule can be produced by polymerizing silicon esters of epoxy alcohols to high molecular weight polyethers with an organometal catalyst and then converting the silicon ester groups to hydroxyl groups by appropriate reaction with an active hydrogen compound.

These new hydroxyl-containing polyethers are homopolymers prepared from silicon esters of epoxy alcohols or copolymers of said silicon esters with at least one other epoxide-containing monomer wherein the epoxy group is an oxirane or oxetane ring and will contain repeating units of the formula $$\left[\begin{array}{c} R \\ | \\ -CH-CH-O- \\ | \\ Z \\ | \\ OH \end{array}\right]$$

where Z is

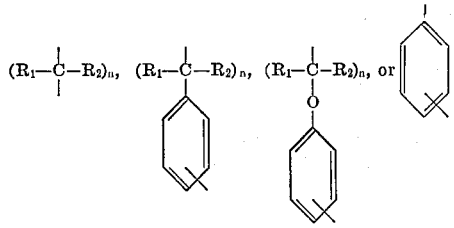

R is —Z—OH or any one of $R_1$ or $R_2$; $R_1$ and $R_2$ are hydrogen, alkyl, alkenyl, aryl, alkaryl, cycloalkyl, aralkyl, haloalkyl, or alkoxyalkyl radicals; and $n$ is a number from 1 to 20. These hydroxyl-containing polyethers are benzene insoluble and will usually have a molecular weight greater than about 50,000, and preferably greater than about 100,000, and a reduced specific viscosity (RSV) greater than 0.2, preferably greater than 0.5, and more preferably greater than 1.0.

As stated, the hydroxyl-containing polyethers of this invention are prepared by polymerizing, i.e., homopolymerizing or copolymerizing, a silicon ester of an epoxy alcohol with an organometal catalyst. The esters of epoxy alcohols which can be used as starting material have the general formula

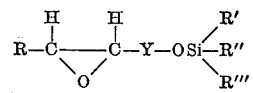

where Y is

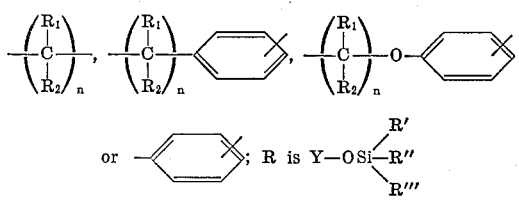

or any one of $R_1$ and $R_2$ where $R_1$, $R_2$, and $n$ are as previously stated; and R', R", and R''' are the same or different alkyl, alkenyl, aryl, alkaryl, cycloalkyl, aralkyl, haloalkyl, or alkoxyalkyl radicals. Specific silicon esters which are useful for preparing the high molecular weight polyethers of the invention include trimethylsilyl glycidyl ether, triethylsilyl glycidyl ether, tributylsilyl glycidyl ether, methyldiphenylsilyl glycidyl ether, methyldibenzylsilyl glycidyl ether, tris(chloromethyl) silyl glycidyl ether, tris(methoxymethyl)silyl glycidyl ether, tricyclohexylsilyl glycidyl ether, allyldibutylsilyl glycidyl ether, methoxymethyl diethylsilyl glycidyl ether, methylditolylsilyl glycidyl ether, cis- and trans-1-trimethylsiloxy-2,3-epoxybutane, cis- and trans-1,4-bis(trimethylsiloxy)-2,3-epoxybutane, cis- and trans-1,5-bis(trimethylsiloxy)-2,3-epoxypentane, 1-trimethylsiloxyl-3,4 - epoxybutane,1-trimethylsiloxyl-5,6-epoxyhexane, cis- and trans-1-trimethylsiloxyl-9,10-epoxyoctadecane, o-, m-, and p-trimethylsiloxylphenyl glycidyl ether, 4(p)-trimethylsiloxyl-2,6-di-tert-butylphenyl glycidyl ether, o-, m-, and p-trimethylsiloxyl styrene oxide, cis- and trans-1-trimethylsiloxymethyl-2-chloromethyl ethylene oxide, cis- and trans-1-trimethylsiloxymethyl-2-phenyl ethylene oxide, and cis- and trans-1,2-bis(trimethylsiloxymethyl)ethylene oxide. Such silicon esters are known compounds and can be prepared, for example, according to the method described in U.S. Patent 2,730,532 to R. W. Martin.

Suitable epoxide-containing monomers which can be copolymerized with these silicon esters have an epoxy group, which is an oxirane or oxetane ring, and are oxiranes or oxetanes. Exemplary of the oxiranes are the alkylene oxides such as ethylene oxide, 1,2-propylene oxide, butene oxides (butene-1-oxide and the cis- and trans-butene-2-oxides), isobutylene oxide; substituted alkylene oxides such as epichlorohydrin, epibromohydrin, epifluorohydrin, methallyl chloride epoxide, trifluoromethylethylene oxide, perfluoropropylene oxide, perfluoroethylene oxide, vinyl chloride epoxide, dichloroisobutylene epoxide, etc.; cycloaliphatic epoxides such as cyclohexene oxide, vinyl cyclohexene monoxide, vinyl cyclohexene dioxide, α-pinene epoxide, dipentene epoxide, etc.; epoxy ethers such as alkyl glycidyl ethers, as, for example, methyl glycidyl ether, ethyl glycidyl ether, isopropyl glycidyl ether, isobutyl glycidyl ether, tert-butyl glycidyl ether, n-hexyl glycidyl ether, n-octyl glycidyl ether, etc.; phenyl glycidyl ether, chlorophenyl glycidyl ethers, nitrophenyl glycidyl ethers, alkylphenyl glycidyl ethers, chloroalkyl glycidyl ethers, such as chloroethyl glycidyl ether; unsaturated glycidyl ethers such as vinyl glycidyl ether, allyl glycidyl ether, α-allylphenyl glycidyl ether, etc.; glycidyl esters such as glycidyl acetate, glycidyl propionate, glycidyl pivalate, glycidyl methacrylate, glycidyl acrylate, glycidyl oleate, glycidyl resinate, etc.; alkyl glycidates such as methyl glycidate, ethyl glycidate, etc.; and other epoxides, as, for example, styrene oxide, α-methylstyrene oxide, butadiene monoxide, butadiene dioxide, epoxy stearates, 1-dimethylamino - 2,3 - epoxy propane, trimethyl-2,3-epoxypropyl ammonium chloride, etc. Particularly useful are ethylene oxide and its monosubstituted derivatives such as propylene oxide, epihalohydrins, etc.

The oxetanes which can be copolymerized with the silicon esters are characterized by the structural formula

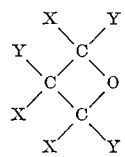

wherein each X and each Y substituent is any group other than those which react with the catalyst, such as free hydroxyl, primary amino, or secondary amino groups. By way of example, suitable X and Y substituents include such substituents as hydrogen; halogens including fluoro, chloro, bromo, and iodo substituent groups; alkyl, cycloalkyl, aryl, and aralkyl groups such as methyl, ethyl, propyl, butyl, cyclohexyl, phenyl, tolyl, benzyl, and the like; nitroalkyl such as nitromethyl, nitroethyl, and the like; nitratoalkyl such as nitratomethyl, nitratoethyl, and the like; cyanoalkyl such as cyanomethyl, cyanoethyl, and the like; alkoxy, aryloxy, aralkoxy, etc., such as methoxy, ethoxy, phenoxy, and the like; alkyl-, cycloalkyl-, aryl-, and aralkyloxymethyl groups such as methoxymethyl, ethoxymethyl, phenoxymethyl, benzyloxymethyl, and the like; acyloxyalkyl groups such as acetoxymethyl, acetoxyethyl, benzoxymethyl, and the like; haloalkyl groups such as chloromethyl, bromoethyl, iodomethyl, fluoromethyl, chloroethyl, chloropropyl, and the like; tertiary aminoalkyl groups such as dimethylaminomethyl, dimethylaminoethyl, and the like; acylamidoalkyl groups such as acetamidomethyl, sulfonamidomethyl, and the like; ethylenically unsaturated aliphatic radicals such as vinyl, propenyl, isopropenyl, allyl, methallyl, butenyl, allyloxymethyl, propenyloxymethyl, methallyloxymethyl, oleyl, and the like; and cycloalkyl or aryl radicals containing an ethylenically unsaturated substituent and cycloalkyl radicals containing an ethylenic double bond in the ring, as, for example, 4-vinylcyclohexyl, α-terpinyl, γ-terpinyl, abietyl, cyclohexenylmethyl, o-allylphenyl, p-vinylbenzyl, and the like. Illustrative of typical oxetanes which the comonomer can comprise include 2-oxetane, 2-bromo oxetane, 2-methyl oxetane, 2-cyclohexyl oxetane, 2-benzyl oxetane, 2-nitropropyl oxetane, 2-cyanoethyl oxetane, 2-methoxy oxetane, 2-phenoxy oxetane, 2-methoxyethyl oxetane, 2-benzyloxymethyl oxetane, 2-allyl oxetane, 2-vinylbenzyl oxetane, 2-chloromethyl oxetane, and the like; 2,2-bis(chloromethyl) oxetane, 2,2-bis(2-chloroethyl) oxetane, 2,2-dimethyl oxetane, 2-chloro-2-methyl oxetane, 2-fluoro-2-bromomethyl, oxetane, 2,2-bis(nitratomethyl) oxetane, 2-methoxy-2-methyl oxetane, 2-carbomethoxy-2-chloromethyl oxetane, 2-methallyl-2-methyl oxetane, and the like; 2-vinyl-3,3-bis(chloromethyl) oxetane, 2 - methoxy-3,3-bis (bromomethyl) oxetane, 2-vinylbenzyl-3,3-dimethyl oxetane, 2-allyloxymethyl-3-chloromethyl-3-ethyl oxetane, 2-phenoxymethyl-3-fluoro-3-methyl oxetane, and the like; 2-methyl-3,3-bis(chloromethyl) - 4 - methyl oxetane, 2-vinyl-3,3-bis(iodomethyl)-4-methoxy oxetane, 2-chloromethyl-3,3-dimethyl-4-chloromethyl oxetane, 2-chloro-3-ethyl-3-methoxymethyl-4-(o-allylphenyl) oxetane, 2-ethyl-3,3-bis(phenoxymethyl)-4-allyl oxetane, and the like; 2-methyl-3-methyl oxetane, 2-chloromethyl-3-bromo oxetane, 2-methoxy-3-butenyl oxetane, 2-methallyloxymethyl-3-ethyl oxetane, 2-propenyl-3-bromoethyl oxetane, 2-methoxymethyl-3-propyl oxetane, and the like; 3-chloro oxetane, 3-ethyl oxetane, 3-cyclohexyl oxetane, 3-phenyl oxetane, 3-methoxy oxetane, 3-allyl oxetane, 3-chloromethyl oxetane, 3-vinyl oxetane, and the like; 3,3-bis (chloromethyl) oxetane, 3,3-bis(bromomethyl) oxetane, 3,3-bis(iodomethyl) oxetane, 3,3-bis(fluoromethyl) oxetane, 3,3-bis(2-chloroethyl) oxetane, 3-bromomethyl-3-chloromethyl oxetane, 3,3-dimethyl oxetane, 3,3-diethyl oxetane, 3,3-bis(chloro) oxetane, 3,3-bis(bromo) oxetane, 3-chloro-3-chloromethyl oxetane, 3-bromo-3-ethyl oxetane, 3-fluoro - 3 - bromomethyl oxetane, 3-fluoro-3-chloro oxetane, 3-ethyl-3-methyl oxetane, 3-chloromethyl-3-ethyl oxetane, 3-chloromethyl-3-methyl oxetane, 3,3-bis(cyanomethyl) oxetane, 3,3-bis(nitratomethyl) oxetane, 3-chloromethyl-3-nitromethyl oxetane, 3-methoxy-3-methyl oxetane, 3-ethyl-3-methoxymethyl oxetane, 3-ethoxymethyl - 3 - methyl oxetane, 3 - carbomethoxy-3-chloromethyl oxetane, 3,3-bis(phenoxymethyl) oxetane, 3-vinyl-3-methyl oxetane, 3-allyl-3-chloromethyl oxetane, 3-isopropenyl-3-ethyl oxetane, 3-chloromethyl-3-(4-vinylcyclohexyl) oxetane, 3-methyl-3-methallyl oxetane, 3,3-bis(allyl) oxetane, and the like; 2-methyl-3-methyl-4-methyl oxetane, 2-ethyl-3-chloromethyl-4-ethyl oxetane, 2-chloromethyl-3-vinyl-4-chloromethyl oxetane, 2-methoxy-3-bromo-4-methyl oxetane, 2-allyl-3-methoxy-4-carbomethoxy oxetane, and the like; 2-methyl-4-methyl oxetane, 2-vinyl-4-chloroethyl oxetane, 2-chloro-4-allyl oxetane, 2-methoxy - 4 - ethyl oxetane, 2 - chloromethyl-4-chloromethyl oxetane, 2-chloromethyl - 4 - cyanomethyl oxetane, and the like. Moreover, mixtures of two or more of any of the above oxiranes or oxetanes can be used as the comonomer component whenever it is desired, as, for example, to modify the properties of the end product.

The polymerization (homopolymerization or copolymerization) of the silicon esters of epoxy alcohols to high molecular weight polyethers can be readily carried out using as the catalyst an organoaluminum compound, preferably one which has been reacted with about 0.01 to about 1.5 moles of a chelating agent such as acetylacetone , benzoyl acetone, acetoacetic acid and its esters, ethyl glycolate, oxalic acid, glyoxal monoxime, etc., and/or reacted with from about 0.1 to about 1.5 moles of water per mole of the organoaluminum compound, as described and claimed in U.S. Patent 3,219,591. Other types of catalysts that can be used for polymerizing the silicon ester of an epoxy alcohol are the modified organozinc and organomagnesium compounds, as, for example, diethylzinc reacted with 0.2 to 1.2 moles of water per mole of zinc, and diethylmagnesium reacted with a polyreactive hydrogen compound such as water, glycols, ammonia, amines, ketones, etc., as, for example, with 0.1 to 1.2 moles of water or 0.2 to 0.8 mole of a polyhydric alcohol or polyhydric phenol.

The polymerization reaction can be carried out by any desired means, either as a batch or continuous process with the catalyst added all at one time or in increments during the polymerization or continuously throughout the polymerization. If desired, the monomer may be added gradually to the polymerization system. It may be carried out as a bulk polymerization process, in some cases at the boiling point of the monomer (reduced to a convenient level by adjusting the pressure) so as to remove the heat of reaction. However, for ease of operation, it is more generally carried out in the presence of an inert diluent. Any diluent that is inert under the polymerization reaction conditions may be used, as, for example, ethers such as the dialkyl, aryl, or cycloalkyl ethers, as, for example, diethyl ether, dipropyl ether, diisopropyl ether, aromatic hydrocarbons such as benzene, toluene, etc., or saturated aliphatic hydrocarbons and cycloaliphatic hydrocarbons such as n-heptane, cyclohexane, etc., and halogenated hydrocarbons, as, for example, chlorobenzene, or haloalkanes such as methyl chloride, ethyl chloride, methylene chloride, chloroform, carbon tetrachloride, ethylene dichloride, etc. Obviously, any mixture of such diluents may be used and in many cases is preferable. For example, when saturated aliphatic hydrocarbons are used as the diluent, it is preferable, particularly if high molecular weight polymers are desired or if very little diluent is present, to use them in admixture with ethers.

The polymerization process in accordance with this invention may be carried out over a wide temperature range and pressure. Usually, it will be carried out at a temperature from about −80° C. up to about 250° C., preferably from about −80° C. up to about 150° C., and more preferably within the range of about −30° C. to about 100° C. Usually, the polymerization process will be carried out at autogenous pressure, but superatmospheric pressures up to several hundred pounds may be used if desired and, in the same way, subatmospheric pressures may also be used.

The silicon ester polymers are then converted to hydroxyl-containing polyethers by reaction with active hydrogen compounds such as water, alcohols, acids, and the like, or mixtures thereof. Particularly suitable are water, methanol, ethanol, isopropanol, n-propanol, butanol, hydrochloric acid, hydrobromic acid, hydrofluoric acid, sulfuric acid, toluene-sulfonic acid, acetic acid, formic acid, propionic acid, and preferably water, methanol, and hydrochloric acid. Decomposition can be carried out on the isolated silicon ester polymer or without isolating it from the polymerization reaction under a wide variety of conditions using solutions, suspensions, or emulsions of the polymer at temperatures ranging from about 0 to about 200° C., and preferably at from about 20° C. to about 150° C. Reaction time will vary depending upon the reactivity of the cleaving agent as well as the medium, polymer concentration, temperature, and the particular polyether employed.

Isolation of the hydroxyl-containing polyether will depend upon the solubility properties of the polymer and on the reagent(s) and method employed for converting the silicon ester polymer to the hydroxyl-containing product. Depending upon these factors, the product can be isolated by filtration, centrifugation, evaporation of diluents, precipitation with a nonsolvent followed by filtration or centrifugation, and the like.

The hydroxyl-containing polyethers of this invention can be prepared in a wide variety of molecular weights, depending upon the molecular weight of the silicon ester polymer. In general, they have a weight average molecular weight of at least about 50,000, and preferably greater than about 100,000.

As pointed out above, the hydroxyl-containing polyethers are further characterized as being benzene insoluble. In the case of the copolymers of glycidol and a different oxirane or an oxetane, this benzene insolubility will in many cases depend on the character and amount of the comonomer. Thus, in the case of copolymers with ethylene oxide, the latter can be present up to an amount of about 99% whereas in the case of propylene oxide and the amorphous copolymers of epichlorohydrin, the maximum amount of the comonomer will be about 75% in order to retain the property of benzene insolubility. On the other hand, with crystalline polymers from monomers such as cis-2-butene oxide, epichlorohydrin, or phenyl glycidyl ether, an amount of 99% can be present. These benzene-insoluble products are high molecular weight and hydrophilic in character, particularly in the case of the amorphous polymers. The crystalline and amorphous polymers, being benzene-insoluble, are solvent and oil resistant.

Because the hydroxyl-containing polyethers of this invention have hydroxyl groups located throughout the polymer molecule, they have hydrophilicity or water-absorbing properties which make them useful for many diverse applications depending primarily on whether the products are crystalline or, if amorphous, whether they are hard and rigid or elastomeric and rubbery. Hence, the products are useful in such applications as clothing from fibers, films, rigid or elastic foams, sponges, binders for synthetic leather, elastic fibers, and the like. The hydroxyl groups also provide sites for cross-linking reactions with di- or polyfunctional compounds which react under appropriate temperature, pressure, and catalyst conditions with the hydroxyl groups. Such di- or polyfunctional compounds include the di- or polyisocyanates such as m- or p-phenylene diisocyanate, 2,4-toluene diisocyanate, 1,5-naphthyl diisocyanate, methylene di(p-phenyl diisocyanate), hexamethylene diisocyanate, triphenylmethane triisocyanate, etc., di- or polyepoxides such as Epon resins, as, for example, the diglycidyl ether of Bisphenol-A, or di- or triaziridines, as, for example, tris[1-(2-methyl) aziridinyl] phosphine oxide, tris(1-aziridinyl) phosphine oxide, or di- or polyanhydrides such as pyromellitic anhydride, or di- or polyimides such as phenylene-bis-maleimide; phenol-formaldehyde resins; urea-formaldehyde resins; melamine-formaldehyde resins; etc.

The hydroxyl groups also provide sites for the preparation of carboxy derivatives of the polyethers. For example, the hydroxyl-containing polyethers can be reacted with esters of haloacetic acid, e.g., methyl or ethyl chloroacetate, to yield the corresponding carbomethoxy- or carboethoxymethyl ether, or with esters of the type of p-chloromethyl benzoic acid esters to yield a carbalkoxyphenylmethyl ether. Thus, poly(glycidol) with a haloacetate yields a polymer having the structure

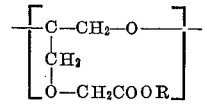

where R is alkyl, phenyl, etc. Another method of preparing such carboxy derivatives is to react the hydroxyls of the hydroxy-containing polyether with a halonitrile, as, for example, α-chloroacetonitrile, followed by hydrolysis of the nitrile group to a free carboxyl group.

The crystalline, hydroxyl-containing polyethers, and particularly the poly(glycidol)s, are high melting polymers which have excellent physical properties and are readily converted into fibers of superior properties by melt or solution spinning techniques.

The amorphous poly(glycidol)s and the copolymers of glycidol with ethylene oxide which are water soluble are particularly useful as thickeners, protective colloids, oil well drilling additives, starch modifiers, adhesives, binders, textile sizes, detergent additives, coagulants, and the like. Poly(glycidol) or copolymers containing greater than about 50% glycidol units are especially useful since their water solutions are insensitive to shear degradation and they are relatively insensitive to air oxidation promoted by heat and/or light.

The hydroxyl-containing polyethers of this invention can also contain stabilizers such as ultraviolet light absorbers, antioxidants, particularly of the phenolic or aromatic amine type, antacids, and the like, as well as other additives such as plasticizers, fillers, as, for example, silica, asbestos, clay, carbon black, and the like, reactive silanes, etc.

The following examples illustrate the preparation of the hydroxyl-containing polyethers of this invention. All parts and percentages are by weight unless otherwise indicated. All examples were run under a nitrogen atmosphere. The molecular weight of the polyethers is indicated by their reduced specific viscosity (RSV) as determined on a 0.1% solution of the polyethers in a suitable solvent. In the case of water-soluble products, the RSV can be determined in water or in a 3% aqueous solution of hydrogen chloride. In the case of those products that are water insoluble, those having lower hydroxyl contents are determined in chloroform at 25° C. or α-chloronaphthalene or tetrachloroethylene at 100° C., and those having high hydroxyl contents are determined in hexamethyl phosphoramide at 25° C., 100° C., or 135° C., the higher temperatures being necessary for the crystalline products.

Example 1

A polymerization vessel with a nitrogen atmosphere was charged with 37 parts of toluene as diluent and 10 parts of trimethylsilyl glycidyl ether. After equilibrating at 50° C., 0.23 part (triethylaluminum basis) of catalyst was injected into the vessel. The catalyst was prepared by diluting a 1.5 molar solution of triethylaluminum in n-heptane to 0.5 molar with diethyl ether, adding water while stirring, in an amount equal to 0.5 mole per mole of aluminum at 0° C. over a 1-hour period, followed by adding acetylacetone with stirring in an amount equal to 0.5 mole per mole of aluminum at 0° C. over a period of 15 minutes, and then stirring for 1 hour at 0° C. and for 10 hours at 25° C. The polymerization was carried out by agitating the mixture for 19 hours at 50° C., after which time the reaction was short-stopped by the addition of 4 parts of ethanol. To the reaction mixture was then added 190 parts of methanol and the mixture was agitated for 3 days at 30° C., after which time 9 parts of a 50:50 (by volume) acetylacetone-ethanol mixture was added and the agitation continued for one more day at 30° C. An additional 190 parts of methanol was added and agitation was continued for two more days at 30° C. to give a viscous, stringy solution from which the polymer was precipitated by adding 8 volumes of acetone. This acetone-insoluble polymer was collected, washed twice with acetone and once with a 0.2% acetone solution of 4,4′-thiobis(3-methyl-6-tert-butylphenol), and then dried at room temperature under vacuum. This acetone-insoluble poly(glycidol) was rubber-like, obtained in 61% conversion, and had an RSV in water at 25° C. of 17.9. It gave a very viscous solution with water or methanol, was soluble in hexamethyl phosphoramide, 2% aqueous sodium bicarbonate, 5% aqueous sodium carbonate, and 0.5% aqueous sodium hydroxide, and insoluble in chloroform and benzene.

The acetone-soluble polymer fraction was recovered from the methanol-acetone supernatant by adding 0.1% (based on polymer) of 4,4′-thiobis(3-methyl-6-tert-butylphenol), stripping off the solvent, and drying at room temperature under vacuum. This polymer fraction, which amounted to 2.0 parts (39% conversion and was soluble in water and 3% aqueous hydrogen chloride, was agitated with 40 parts of methanol for 4 days after which time 79 parts of methanol and 200 parts of water were added. The resulting solution was stripped of one-half of the solvent to give a viscous, opalescent solution from which the insoluble portion was separated. The small amount of insoluble so obtained was washed twice with water and dried for 16 hours at 80° C. under vacuum, to yield a white, highly crystalline powder (by X-ray). Further partial stripping of the remaining solution gave a small amount of additional insoluble polymer which, after isolation as above, was a white solid of lower crystallinity (by X-ray). The remainder of the solution was stripped of solvent and dried for 16 hours at 80° C. under vacuum to give a tough, amorphous rubber having an RSV of 3.5 in 3% HCl. This fraction was shown by infrared and nuclear magnetic resonance (NMR) to be poly(glycidol), no Si(CH$_3$)$_3$ groups being present. It was largely soluble in water after 4 days, soluble in 3% aqueous hydrogen chloride and in 2% aqueous acetic acid, and was insoluble in benzene.

A 5% suspension of kaolin was prepared by stirring in water for 2 hours and then allowing it to stand for 16 hours. A portion of the acetone-insoluble poly(glycidol) of this example was tested as a flocculation agent and compared with commercial flocculants as follows: varying amounts of a 0.1% aqueous solution of the acetone-insoluble polymer or commercial flocculants were added to 100 ml. portions of the 5% suspension of kaolin in water, and each portion was rotated 360° twenty times and then permitted to settle. In this test flocculation was evaluated by measuring the supernatant volume, as a percent of the total volume, after 5 minutes settle time and measuring the turbidity of the supernatant after 15 minutes settle time on a Klett-Summerson colorimeter in Klett units wherein higher readings refer to higher turbidity. Details as to the compositions and the results obtained are tabulated below.

| Polymer (p.p.m. based on kaolin) | Supernatant Vol. (percent) | Klett reading |
|---|---|---|
| Poly(glycidol): | | |
| 250 | 65 | 5 |
| 500 | 69 | 20 |
| 1,000 | 69 | 17 |
| Commercial copolymer,[1] 250 | 32 | |
| Commercial PEO,[2] 250 | 57 | |

[1] Acrylamide—acrylic acid copolymer.
[2] Very high molecular weight poly(ethylene oxide).

The poly(glycidol) did not show any tendency to redisperse the kaolin at high concentrations (based on Klett data) as do commercial flocculants, and hence is a superior flocculating agent.

Example 2

The general procedure of Example 1 was repeated except that 25 parts of monomer was employed and the polymer was isolated as follows.

At the end of the polymerization time the reaction was short-stopped by adding 9 parts of a 50:50 (by volume) acetylacetone:ethanol mixture. Methanol (790 parts) was added to the reaction mixture, which was then agitated for 2 days at 50° C. and then was shaken until dissolution was complete (10 days). The polymer was precipitated from the solution by adding 4 volumes of acetone, and the precipitate was collected, washed neutral with acetone, and then dried at room temperature under vacuum. The poly(glycidol) so obtained was confirmed by NMR analysis and was a white rubber having an RSV of 5.7 in water at 25° C., insoluble in benzene, and was obtained in 81% conversion. That hydrolysis was complete was shown by the fact that it contained no Si(CH$_3$)$_3$ groupings by NMR analysis. A portion of this polymer, after stabilization with 0.1% of 4,4′-thiobis(3-methyl-6-tert-butylphenol) and drying at room temperature, was used for the preparation of films, as follows:

(A) A 30-mil wet film was cast from a 2.5% aqueous solution of the polymer onto a glass plate. The resulting film, after drying at room temperature, was clear, gel free, and strongly adherent to the glass. It readily dissolved from the plate in water.

(B) A 30-mil wet film was also cast onto glass from a 2.5% aqueous solution of the polymer containing 20%, based on dry polymer weight, of a concentrated isopropanol solution of stearato chromic chloride (a Werner-type chromium compound). The film, after air-drying and curing for 5 minutes at 150° C. in a forced draft oven, was continuous, very rubbery, and flexible. Pieces of the film retained their shape after 2 weeks' immersion in water.

The acetone-soluble polymer fraction was isolated from the supernatant by adding 200 parts of water to two-thirds of the supernatant containing 0.5% by weight of the polymer of 4,4′-thiobis(3-methyl-6-tert-butylphenol), stripping the solution to 100 parts by volume, and collecting the insoluble portion. This insoluble portion was washed once with water, once with 3% aqueous hydrogen chloride, then neutral with water, and then was dried at room temperature under vacuum. The poly(glycidol) so obtained was a slightly yellow powder which was crystalline by X-ray diffraction, was soluble in 3% aqueous hydrogen chloride, melting at 194° C. by differential thermal analysis (DTA) with a heat of fusion of 17.7 calories per gram.

Example 3

A polymerization vessel with a nitrogen atmosphere was charged with 40 parts of toluene as diluent and 10 parts of a mixture containing 70% ethylene oxide and 30% trimethylsilyl glycidyl ether. After equilibrating at 30° C., 0.11 part (triethylaluminum basis) of the catalyst of Example 1 was injected into the vessel and the polymerization was carried out by agitating the mixture for 2 hours at 30° C. The reaction was short-stopped by adding 4.5 parts of a 50:50 (by volume) acetylacetone: ethanol solution and the reaction mixture was agitated for 1 day at 50° C. After permitting the short-stopped mixture to stand for 4 days at room temperature, 0.5% (based on the polymer) of a phenolic antioxidant (the reaction product of 1 mole of crotonaldehyde and 3 moles of 3-methyl-6-tert-butylphenol) was added to a portion of the mixture and the polymer was precipitated therefrom in a Waring blendor with about an equal volume of heptane containing 0.03% said antioxidant. After the precipitate settled, the supernatant was decanted and the precipitate was washed twice with a similar amount of heptane containing 0.03% of the antioxidant. The precipitate was then filtered off and dried for 16 hours at 80° C. under vacuum. The copolymer so isolated was a tough solid of moderate crystallinity by X-ray and had an RSV of 9.6 in chloroform at 25° C. It was partly soluble in water (viscous, cloudy solution which gradually became clear when treated with an equal volume of 3% aqueous hydrogen chloride), insoluble in benzene, and infrared analysis showed the copolymer to contain 10% glycidol units.

A second portion of the short-stopped reaction mixture was diluted with chloroform to reduce the viscosity and then was treated with methanol to the point of incipient precipitation. After agitating the mixture for 6 days at room temperature, the polymer was isolated with heptane according to the procedure set forth above. The glycidol-ethylene oxide copolymer was a tough polymer, insoluble in benzene, and had an RSV in chloroform at 25° C. greater than 5. Infrared analysis showed that hydroxyl groups but no $Si(CH_3)_3$ groups were present, demonstrating that methanolysis was complete.

Example 4

The general procedure of Example 3 was repeated except that in this example a 50:50 mixture of propylene oxide and trimethylsilyl glycidyl ether was used and the polymerization time was 3 hours. The reaction was short-stopped by adding 4 parts of anhydrous ethanol, and 3 volumes of diethyl ether was added to dilute the reaction mixture. It was then washed twice with 3% aqueous hydrochloric acid for 1 hour with stirring, washed neutral with water, and 0.5% of 4,4'-thiobis(3-methyl-6-tert-butylphenol), based on the polymer, was added. The polymer was isolated as 3 rubbery fractions: an ether-insoluble fraction (A) obtained by collecting the polymer precipitate, washing with diethyl ether and with ether containing 0.2% of 4,4'-thiobis(3-methyl-6-tert-butylphenol), and drying at room temperature under vacuum; an ether-soluble fraction (B) obtained by removing the solvents from the filtrate left from the isolation of (A), and drying at room temperature under vacuum; and a water-soluble fraction (C) obtained by dialysis of the combined acid and water washes, stripping off the water at 50° C. from the dialyzed solution, and then drying at room temperature under vacuum. The ether-insoluble glycidol-propylene oxide copolymer was a snappy rubber which was insoluble in benzene. It had an RSV greater than 3.4 in chloroform at 25° C., and infrared analysis showed that hydroxyl groups but no $Si(CH_3)_3$ groups were present. The ether-soluble copolymer (RSV greater than 1.5 in chloroform at 25° C.) was a tough rubber which was shown by X-ray to be slightly crystalline. It was insoluble in benzene, and infrared analysis showed the presence of hydroxyl groups but no $Si(CH_3)_3$ groups. The water-soluble copolymer was a tacky rubber (RSV of 2.2 in chloroform at 25° C.) which was insoluble in benzene, and infrared analysis showed the presence of hydroxyl groups but no $Si(CH_3)_3$ groups.

Example 5

The general procedure of Example 3 was repeated except that in this example the monomer charge was a mixture of 70% epichlorohydrin and 30% trimethylsilyl glycidyl ether, and the polymerization was carried out for 42 hours using a total of 0.79 part (triisobutylaluminum basis) of a catalyst prepared by diluting a 1-molar solution of triisobutylaluminum in n-heptane to 0.5 molar with ether, adding an amount of water equal to 0.5 mole per mole of triisobutylaluminum, and then agitating the solution at 30° C. for about 16 hours, half of the catalyst being added initially and the other half after 19 hours of reaction time. At the end of the polymerization the reaction was short-stopped by adding 4.5 parts of 50:50 acetylacetone:ethanol and the mixture was agitated for 1 day at 50° C. and then permitted to stand for 4 days at room temperature. The heptane-insoluble polymer isolated from a portion of this mixture according to the procedure of Example 3 was a snappy rubber having an RSV 4.2 in α-chloronapthalene containing 3% acetylacetone at 100° C. Elemental analysis indicated that the copolymer contained 74.3% epichlorohydrin.

A second portion of the short-stopped reaction mixture was diluted with toluene to reduce the viscosity and then treated with 20% by volume of methanol. After agitating the mixture for 6 days at room temperature, the polymer was isolated with heptane according to the procedure set forth above. The polymer was a snappy rubber of RSV 2.5 in hexamethyl phosphoramide at 100° C. and by infrared analysis was shown to contain hydroxyl groups and no $Si(CH_3)_3$ groups.

Example 6

The general procedure of Example 3 was repeated except that in this example the monomer charge was a mixture of 95% cis-butene-2-oxide and 5% trimethylsilyl glycidyl ether, the diluent was 250 parts of methylene chloride, and the polymerization was carried out for 19 hours at 65° C. using 0.44 part (triethylaluminum basis) of catalyst. At the end of the polymerization time the reaction was short-stopped with acetylacetone:ethanol as in Example 3 and then diluted with methylene chloride for ease in handling. Methanol (20% by volume) was added and the mixture was agitated for 6 days at room temperature after which time the polymer was precipitated with heptane according to the procedure of Example 3. The heptane-insoluble polymer was crystalline by X-ray diffraction, insoluble in benzene, and had an RSV in hexamethyl phosphoramide at 100° C. greater than 3.

Example 7

The general procedure of Example 1 was repeated except that in this example the monomer charge was a mixture of 7 parts trimethylene oxide and 3 parts trimethylsilyl glycidyl ether, and the polymerization was carried out at 65° C. for 3 hours using as catalyst 0.46 part (triethylaluminum basis) of 1 molar triethylaluminum containing 0.5 mole of water and 1.0 mole of acetylacetone per mole of aluminum. At the end of the polymerization time the reaction was short-stopped with 4 parts of ethanol, chloroform was added to reduce the viscosity, and then methanol was added to the point of incipient precipitation. After agitating the mixture for 6 days at room temperature, the polymer was isolated with heptane according to the procedure of Example 3. The copolymer product was a tough rubber of high hydroxyl content (infrared analysis), was insoluble in benzene, and had an RSV greater than 5 in hexamethyl phosphoramide at 25° C.

What I claim and desire to protect by Letters Patent is:

1. As a new composition of matter a solid, high molecular weight hydroxyl-containing polyether characterized by having a reduced specific viscosity (RSV) greater than 0.2 and repeating units of the formula

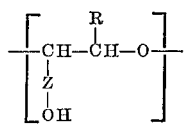

where Z is selected from the group consisting of

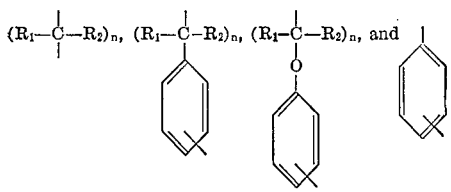

R is selected from the group consisting of —Z—OH, $R_1$, and $R_2$; $R_1$ and $R_2$ are each selected from the group consisting of hydrogen and alkyl, alkenyl, aryl, alkaryl, cycloalkyl, aralkyl, haloalkyl and alkoxyalkyl radicals containing 1 to 8 carbon atoms; and $n$ is a number from 1 to 20, said polyether being insoluble in benzene.

2. The composition of claim 1 wherein the hydroxyl-containing polyether is the homopolymer of glycidol.

3. The composition of claim 2 wherein the homopolymer is crystalline.

4. The composition of claim 1 wherein the hydroxyl-containing polyether is a copolymer of glycidol and at least one other epoxide monomer wherein the epoxy group is an oxirane ring.

5. The composition of claim 4 wherein the other epoxide is the ethylene oxide.

6. The composition of claim 4 wherein the other epoxide is propylene oxide.

7. The composition of claim 4 wherein the other epoxide is epichlorohydrin.

8. The composition of claim 4 wherein the hydroxyl-containing polyether is a crystalline copolymer of glycidol and cis-butene-2-oxide.

9. The composition of claim 1 wherein the hydroxyl-containing polyether is a copolymer of glycidol and at least one other epoxide monomer wherein the epoxy group is an oxetane ring and the monomer is free of reactive hydroxyl, primary amino and secondary amino groups.

10. The composition of claim 9 wherein the other epoxide is trimethylene oxide.

References Cited

Journal of Polymer Science, vol. 4 (1253–1259), Part A–1, June 1966, Sandler, S. et al.

WILLIAM H. SHORT, *Primary Examiner.*

T. PERTILLA, *Assistant Examiner.*

U.S. Cl. X.R.

260—77.5, 88.3, 830, 838, 849, 37, 45.7, 45.9; 252—352, 89